US012125035B2

United States Patent
Lenke

(10) Patent No.: US 12,125,035 B2
(45) Date of Patent: Oct. 22, 2024

(54) SAFE AUTHENTICATION FROM AN AUTOMOBILE

(71) Applicant: Cerence Operating Company, Burlington, MA (US)

(72) Inventor: Nils Lenke, Aachen (DE)

(73) Assignee: Cerence Operating Company, Burlington, MA (US)

( * ) Notice: Subject to any disclaimer, the term of this patent is extended or adjusted under 35 U.S.C. 154(b) by 614 days.

(21) Appl. No.: 17/111,603

(22) Filed: Dec. 4, 2020

(65) Prior Publication Data

US 2022/0036365 A1    Feb. 3, 2022

Related U.S. Application Data

(60) Provisional application No. 63/058,867, filed on Jul. 30, 2020.

(51) Int. Cl.
| | |
|---|---|
| G06Q 20/40 | (2012.01) |
| B60R 25/25 | (2013.01) |
| B60R 25/33 | (2013.01) |
| G01S 19/14 | (2010.01) |
| G06F 21/32 | (2013.01) |
| G07C 5/08 | (2006.01) |
| G10L 17/26 | (2013.01) |
| H04L 9/40 | (2022.01) |
| G06Q 40/02 | (2023.01) |
| G10L 17/22 | (2013.01) |

(52) U.S. Cl.
CPC ..... *G06Q 20/40145* (2013.01); *B60R 25/257* (2013.01); *B60R 25/33* (2013.01); *G01S 19/14* (2013.01); *G06F 21/32* (2013.01); *G06Q 20/4015* (2020.05); *G07C 5/0808* (2013.01); *G07C 5/0833* (2013.01); *G10L 17/26* (2013.01); *H04L 63/0861* (2013.01); *H04L 63/0884* (2013.01); *G10L 17/22* (2013.01)

(58) Field of Classification Search
CPC ......... G06Q 20/40145; G06Q 20/4015; G06Q 40/02; B60R 25/257; B60R 25/33; G01S 19/14; G07C 5/0808; G07C 5/0833; G10L 17/22; H04L 63/0861; H04L 63/0884
USPC .......................................................... 705/64
See application file for complete search history.

(56) References Cited

U.S. PATENT DOCUMENTS

| | | | |
|---|---|---|---|
| 10,063,542 B1 | 8/2018 | Kao | |
| 2018/0201226 A1 | 7/2018 | Falkson et al. | |
| 2018/0366128 A1* | 12/2018 | Liu | .......... G10L 17/22 |
| 2019/0027137 A1 | 1/2019 | Sohn et al. | |
| 2019/0389485 A1 | 12/2019 | Collins, II | |
| 2021/0326774 A1* | 10/2021 | Mendes | .................. G06F 21/32 |

FOREIGN PATENT DOCUMENTS

WO    20180217950 A2    11/2018

* cited by examiner

*Primary Examiner* — John W Hayes
*Assistant Examiner* — Wodajo Getachew
(74) *Attorney, Agent, or Firm* — Occhiuti & Rohlicek LLP

(57) ABSTRACT

A biometric corroborator receives an enhanced sound file, a vehicular data provided by a vehicle, and telemetry data provided by the vehicle to a telematics server. It then uses these to corroborate each other before deciding whether to authenticate a proposed transaction.

16 Claims, 3 Drawing Sheets

SAFE AUTHENTICATION FROM AN AUTOMOBILE

RELATED APPLICATIONS

This application claims the benefit of the Jul. 30, 2020 priority date of U.S. Provisional Application 63/058,867, the contents of which are herein incorporated by reference.

FIELD OF INVENTION

The invention pertains to payment processing and in particular, to authentication of payments.

BACKGROUND

Credit cards are convenient ways to make payment. However, it is sometimes possible to arrange to use a credit card to carry out a fraudulent transaction.

To reduce the likelihood of such transactions, it is known to implement various security measures.

SUMMARY

The invention combines voice biometrics with additional measures to create a safe way of authenticating a transaction when one is in a vehicle. In some embodiments, the transaction is a credit-card transaction.

In one practice, the method relies on a sound watermark that is derived in part from voice biometrics.

The sound watermark is then associated with a raw sound file to create watermarked sound data. This watermark comprises secret and non-audible information that is associated with the sound file. In some embodiments, the associated arises as a result of the watermark having been hidden in the raw sound file. In others, the association arises more overtly, with the raw sound file being associated with a watermark file. In this case, with the watermark no longer being encrypted, it is advantageous to encrypt the watermark file.

The watermarked sound data is then enhanced by encoding information derived from the vehicle's own sensors. Examples of such information include location, as derived from a GPS system.

The resulting enhanced watermarked sound data is then transmitted to a remote data-processing system. The remote data-processing system includes data from which it is possible to confirm the speaker's identity based on the voice biometrics. However, the information from the vehicle sensors provides a basis for independent corroboration. Some practices feature carrying out the independent corroboration by communicating with a telematics server for the vehicle.

Some practices include extracting the watermark at the remote data-processing system prior to carrying out a match.

Oher practices include those in which a watermark only represents the identity of the car and thus omits variable data. In this embodiment, the data-processing system learns to accept only speech by a person who is in his car.

The method as described herein makes fraud more difficult. In particular, it impedes interception of communication between client and server and insertion of recorded speech.

In one aspect, the invention features a method executed by a corroborator that is in communication with a telematics server that is in communication with a plurality of vehicles, among which is a first vehicle, includes receiving corroboration data from the first vehicle. The corroboration data includes enhanced watermark sound data that includes a sound watermark, a sound file, and first vehicular information. The method continues with extraction of the voice print and the first vehicular information and carrying out voice biometry on the voice print. Based on the result of having done so, the method continues with receiving first telemetry data from the telematics server, the first telemetry data having been provided to the telematics server by the first vehicle, determining that the first vehicular information and the first telemetry data are consistent, and authenticating a transaction.

Practices of the method include those in which the first vehicular information and the first telemetry data include GPS information indicative of the first vehicle's position, those in which they include a location of the first vehicle, those in which they include identity of the first vehicle, those in which they include both a location of the first vehicle and an identity of the first vehicle, those in which they include a time-varying operational parameter of the first vehicle, and those in which they include information provided by an on-board diagnostic system of the first vehicle.

In those embodiments in which the first vehicular information and the first telemetry data include first and second time-varying operational parameters of the first vehicle, practices of the method also include inspecting the first and second time-varying operational parameters for consistency.

Further practices include those in which the proposed transaction is a credit-card proposed transaction.

Also among the practices of the method are those that include, prior to receiving the first telemetry data, identifying the telematics server from plural telematics servers, each of which receives telemetry data from corresponding plural vehicles.

Some practices include receiving, from a second vehicle, second corroboration data that includes both a sound file and a sound watermark as well as second telemetry data from a telematics server to which the second vehicle sends telemetry data; based on second corroboration data and the second telemetry data, determining that the second vehicle information and the second telemetry data are inconsistent; and providing information indicative of the failure to match the third and fourth vehicular information.

In those practices in which the corroboration data has been encoded, the method further includes decoding the encoded data to retrieve the voice print and the first vehicular information.

Practices further include those in which carrying out voice biometry on the voice print includes determining that the voice print matches a voice print from a voice-print library.

For those cases in which the first vehicular information includes first and second time-varying operational parameters of the first vehicle. some practices also include includes identifying an inconsistency between the first and second time-varying operational parameters.

Practices further include those in which at least one of extracting the voice print and the first vehicular information, determining that the voice print matches a voice print from a voice-print library, receiving second vehicular information from a telematics server that is in communication with the vehicle, determining that the first and second vehicular information match, and authenticating a proposed transaction is carried out non-abstractly and/or without the occurrence of a mental step, and in particular, without the occurrence of a mental step carried out by the mental organ of a human being.

Also among the practices are those in which the watermark has been steganographically incorporated into the sound file and those in which it has been concealed in the sound file as well as those in which the watermark is an encrypted watermark that has been associated with the sound file. In still other practices, the sound file comprises non-audible data.

In another aspect, the invention features an apparatus that includes a biometric corroborator. The biometric corroborator includes a voice-print library, a decoder, and a corroboration channel for receiving telemetry data from a telematics server that receives the telemetry data from vehicles. The decoder is configured to extract, from received corroboration data that includes enhanced watermarked sound data, vehicular information, and voice print information. The biometric corroborator is further configured to compare the voice print information with voice prints in the library and to compare the vehicular information with telemetry received from the telematics server.

Among the embodiments of the corroborator are those in which it includes a multiplexer for switching the corroboration channel from receiving telemetry data from a first telematics server instead of from a second telematics server.

In another aspect, the invention features an apparatus comprising a biometric corroborator that is in communication with a telematics server that is in communication with a plurality of vehicles, among which is a first vehicle. Such a biometric corroborator includes a decoder, a communication channel, a library of voice prints, and a matching engine. The decoder receives corroboration data from the first vehicle. This corroboration data includes a sound file, first vehicular information, and a sound watermark. The decoder extracts, from this corroboration data, the voice print and the first vehicular information, The communication channel receives first telemetry data from a telematics server. This first telemetry data will have been provided to the telematics server by the first vehicle. The library of voice prints is accessed by the matching engine while carrying out voice biometry on the voice print and used in connection with the matching engine's determination that the first vehicular information and the first telemetry data are consistent. In response to identifying consistency between the telemetry data and the first vehicular information, the biometric corroborator transmits a signal authenticating a proposed transaction, an example of which is a credit card or debit card transaction.

Embodiments include those in which the decoder is configured to decode corroboration data in which the first vehicular information and the first telemetry data comprise GPS information indicative of the first vehicle's position, those in which the decoder is configured to decode corroboration data in which the first vehicular information and the first telemetry data comprise a location of the first vehicle, those in which the decoder is configured to decode corroboration data in which the first vehicular information comprises an identity of the first vehicle, those in which the decoder is configured to decode corroboration data in which the first vehicular information and the first telemetry data comprise a location of the first vehicle and an identity of the first vehicle, and those in which the decoder is configured to decode corroboration data in which the first vehicular information and the first telemetry data comprise a time-varying operational parameter of the first vehicle.

In some embodiments, the first vehicular information and the first telemetry data comprise first and second time-varying operational parameters of the first vehicle. In such embodiments, the biometric corroborator is configured to inspect the first and second time-varying operational parameters for consistency.

In other embodiments, the first vehicular information and the first telemetry data comprise information provided by an on-board diagnostic system of the first vehicle.

In other embodiments, the biometric corroborator is further configured to, prior to receiving the first telemetry data, identify the telematics server from plural telematics servers, each of which receives telemetry data from corresponding plural vehicles.

In still other embodiments, the biometric corroborator is further configured to receive, from a second vehicle, second corroboration data from a telematics server to which the second vehicle sends telemetry data and, based on the second corroboration data and the second telemetry data, to determine that the second corroboration data and the second telemetry data are inconsistent, and to provide information indicative of the inconsistency.

Among the embodiments are those in which the corroboration data has been encoded and the decoder is configured to decode the encoded data to retrieve the voice print and the first vehicular information.

In some embodiments, the matching engine is configured to determine that the voice print matches a voice print from a voice-print library.

In other embodiments, the first vehicular information comprises first and second time-varying operational parameters of the first vehicle. In such embodiments, the matching engine is configured to identify an inconsistency between the first and second time-varying operational parameters.

I still other embodiments, the biometric corroborator is configured to cease reception of the first telemetry data and to commence receipt of second telemetry data, the second telemetry being associated with a second vehicle.

Embodiments further include those in which the decoder is configured to identify a watermark has been steganographically incorporated into the sound file and those in which the decoder is configured to identify an encrypted watermark that has been associated with the sound file.

Further embodiments include those in which the sound file comprises non-audible data.

Also among the embodiments of the biometric corroborator are those in which the biometric corroborator includes a multiplexer for causing the corroboration channel to transition between receiving telemetry data from a first telematics server and receiving telemetry data from a second telematics server.

The method as described herein is carried out only in a non-abstract manner by processing systems that are made of matter, specifically baryonic matter, consume energy, and generate waste heat. A description of the abstract implementation has been omitted for clarity. As such, the claims recite non-abstract subject matter. As used herein, "non-abstract" is the converse of "abstract" as that term is understood by the courts of the United States as of the filing of this application. Therefore, anyone who construes the claims as "abstract" is either mistaken or using the term in a manner inconsistent with its legal meaning.

DETAILED DESCRIPTION

Figure 1:
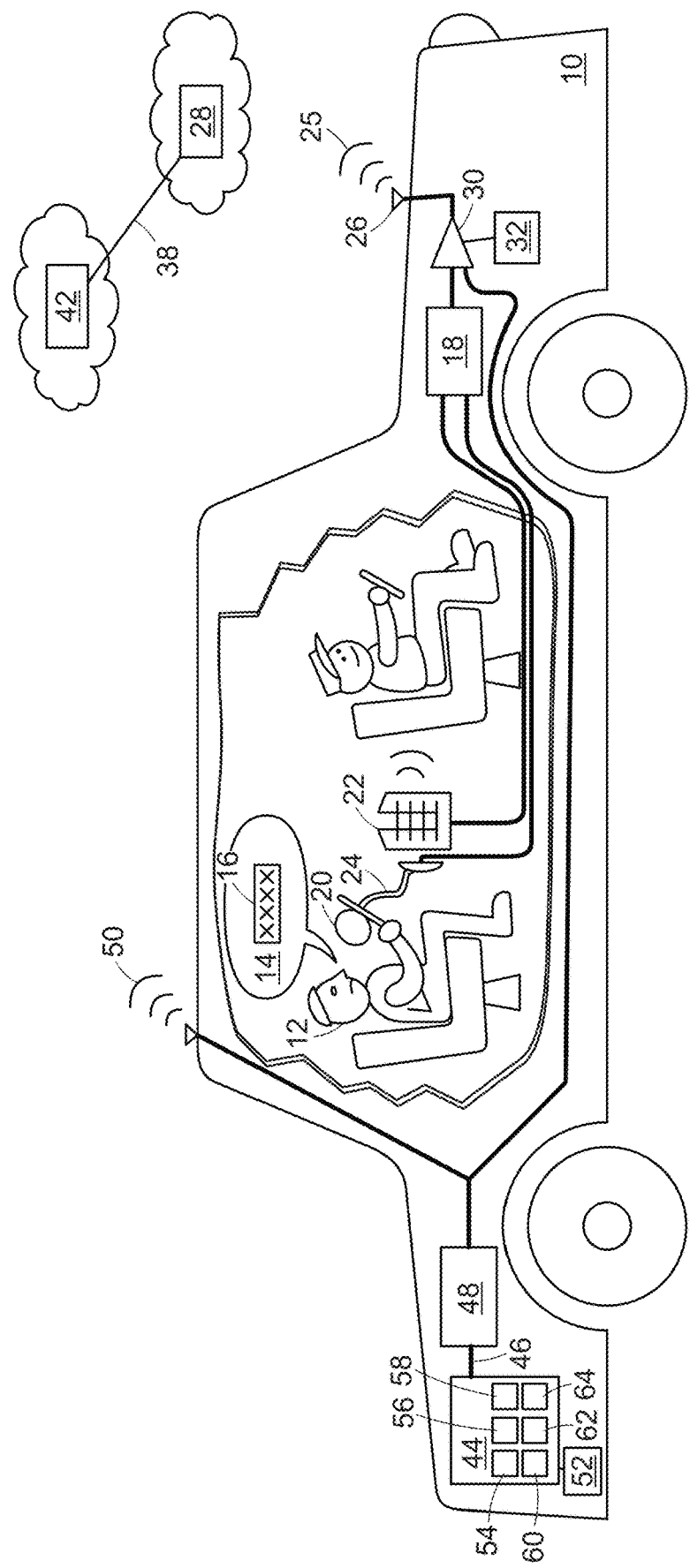
FIG. 1 shows a vehicle that transport an occupant who initiates a secure transaction.

FIG. 1 shows a vehicle 10 transporting an occupant 12 who initiates a secure transaction by forming an utterance 14 that includes a spoken passphrase 16.

The vehicle 10 includes an in-car communication system 18 that is equipped with a microphone 20 and a loudspeaker 22. The microphone 20 receives the utterance 14 and generates a corresponding electrical waveform 24. The in-car communication system 18 receives the waveform 24 and, after some further processing steps, causes corroboration data 25 to be transmitted via an antenna 26 to a biometric corroborator 28. This corroboration data 25 includes enhanced watermark sound data consistent with the occupant's voice, thus permitting identification of the occupant 12.

In a preferred embodiment, transmission to the biometric corroborator 28 includes passing information, including the utterance 14, to an encoder 30. The encoder 30 encodes, onto this information, a sound watermark 32.

Figure 2:
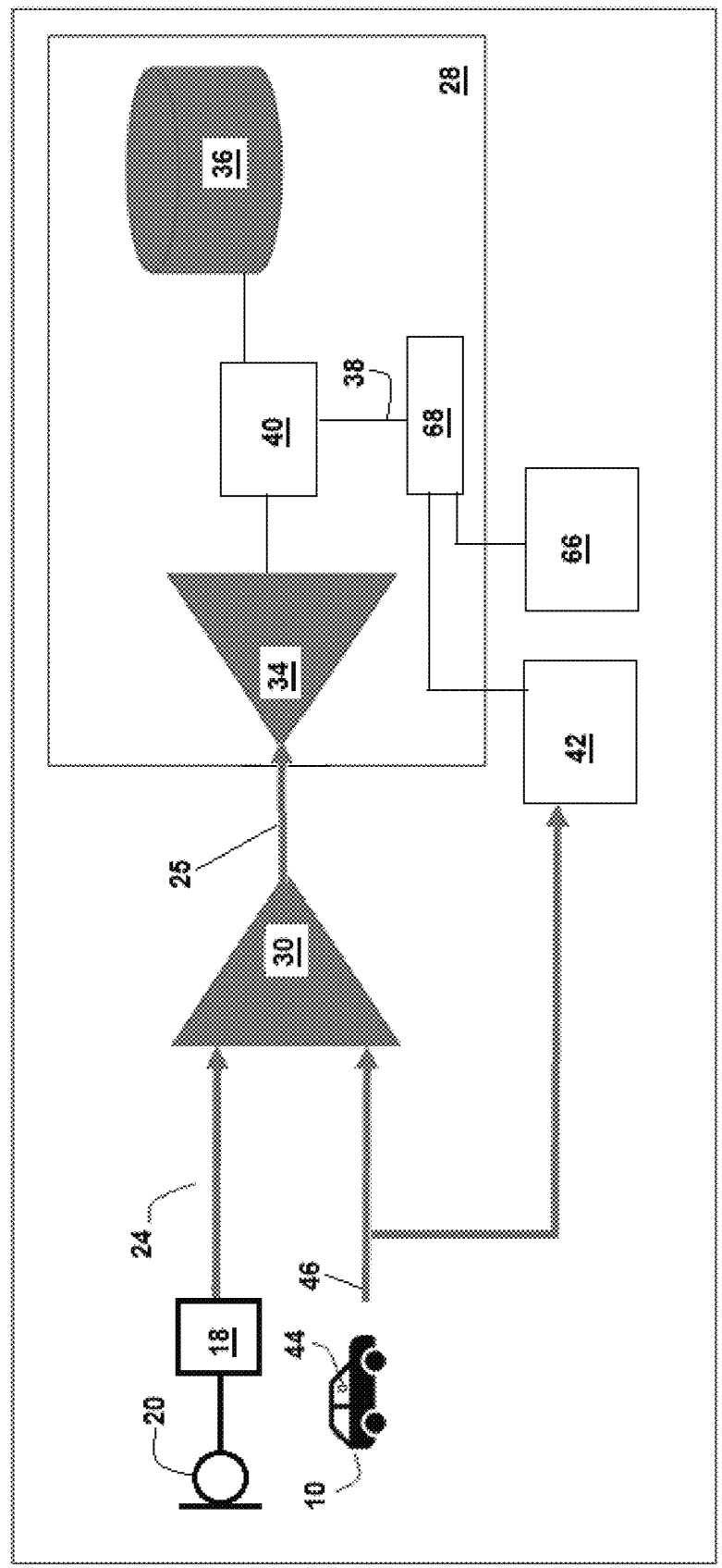
FIG. 2 shows communication between the vehicle of FIG. 1, a telematics server, and a corroboration server.

Referring now to FIG. 2, the biometric corroborator 28 is one that provides voice-biometric services. To provide such services, the biometric corroborator 28 includes a decoder 34, a matching engine 40, and a voice-print library 36. The decoder 34 is one that is configured to decode information provided by the encoder 30. The matching engine 40 confirms the authenticity of the speaker's voice based in part on the library 36.

Additionally, the biometric corroborator 28 features a corroboration channel 38 and a matching engine 40. The corroboration channel 38 connects to a telematics server 42 that receives telemetry data 50 from the vehicle 10. The matching engine 40 that carries out comparisons between information provided by the vehicle 10, information provided by the telematics server 42, and information present in the voice-print library 36.

In some embodiments, the biometric corroborator 28 connects to one or more additional telematics servers 66. In such embodiments, the biometric corroborator 28 further includes a multiplexer 68 to select which telematics server 66, 42 should be connected to the corroboration channel 38. Such a selection is made based on the vehicular information 46, which was transmitted from the vehicle 10 as part of the corroboration data 25.

Referring back to FIG. 1, the vehicle 10 further includes a sensor 44 that provides the vehicular information 46 to a telematics transmitter 48. The telematics transmitter 48 converts this information into telemetry data 50, which it then transmits to the telematics server 42. The telematics server 42 routinely receives telemetry data 50 from many vehicles 10 via a cellular network. This vehicular information 46 is also provided to the encoder 30 for eventual transmission to the biometric corroborator 28.

In some embodiments, the vehicle 10 comprises an on-board diagnostic system 52. In such embodiments, the sensor 44 includes one or more sensing elements associated with the on-board diagnostic system 52.

As used herein, the sensor's output includes vehicular information 46 gathered by one or more sensing elements distributed throughout the vehicle 10, including those associated with the onboard diagnostic system 52. Embodiments include those in which the sensor 44 comprises one or more sensing elements selected from the group consisting of a geolocation device 54, an accelerometer 56, a velocimeter 58, a fuel-level sensor 60, a thermometer 62, and a pressure sensor 64.

Examples of vehicular information 46 include the vehicle's instantaneous position, a track of its position as a function of time, or any kinematic parameter, such as acceleration or velocity. This type of vehicular information 46 can be obtained from one or more of the geolocation device 54, the accelerometer 56, and the velocimeter 58.

Other examples of vehicular information 46 include time-varying operational parameters such as fuel level, as provided by the fuel-level sensor 60, temperature within the vehicle's cabin and exterior temperature, as provided by the thermometer 62, and tire pressures, as measured by the pressure sensor 64.

The vehicular information 46 need not be limited to information gathered by the sensor 44. For example, in some embodiments, vehicular information 46 includes such information as the frequency to which the vehicle's radio is tuned or the vehicle's vehicle identification number (VIN).

Figure 3:
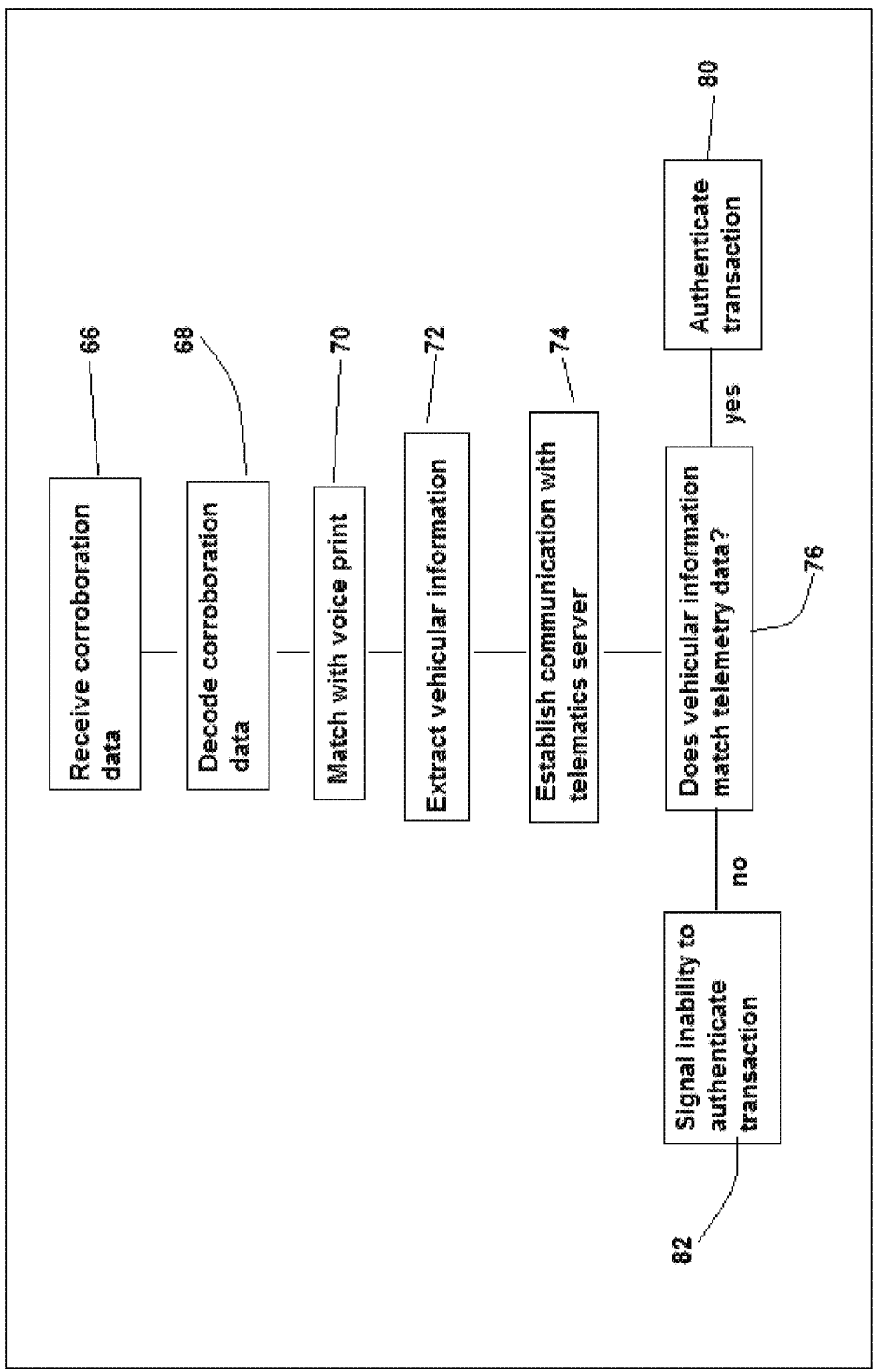
FIG. 3 shows a method carried out by the corroboration server of FIG. 2.

Referring now to FIG. 3, the corroboration server carries out a corroboration process 65 that begins with receiving the corroboration data 25 from the encoder 30. (step 66).

The decoder 34 decodes the corroboration data 25 to extract the sound watermark 32, the vehicular information 46, and the spoken passphrase 16 (step 68). The matching engine 40 then attempts to match the occupant's voice with a voice print from the voice-print library 36 (step 70).

The decoder 34 also extracts the vehicular information 46 that came from the vehicle 10 (step 72) and identifies a telematics server 42 that is in communication with that vehicle 10. The biometric corroborator 28 then establishes communication with the identified telematics server (step 74) after which the matching engine 40 compares the vehicular information 46 received from the vehicle 10 with corresponding telemetry data 50 that the vehicle 10 independently sent to the telematics server 42 (step 76).

If the comparison is favorable, the biometric corroborator 28 provides a signal indicating that the proposed transaction appears authentic (step 80). On the other hand, if the comparison is unfavorable, the biometric corroborator 28 provides a single indicating that the proposed transaction appears to not be authentic (step 82).

In some embodiments, the vehicular information 46 includes several operational parameters that can be checked against each other for consistency. For example, an outside temperature below freezing and spatial coordinates placing the vehicle 10 in a tropical region would be regarded with some suspicion by the biometric corroborator 28.

Having described the invention and a preferred embodiment thereof, what is new and secured by Letters Patent is:

1. An apparatus comprising:
   a biometric corroborator server and a plurality of telematics servers, wherein said biometric corroborator server includes a voice print library, a multiplexer, a receiver, a transmitter, and a corroboration channel;
   wherein said plurality of telematics servers are in communication with said biometric corroborator server and a plurality of vehicles, among which is a first vehicle, and wherein said biometric corroborator server performs operations comprising:
   using said receiver, receiving corroboration data from said first vehicle, said corroboration data comprising a sound file with encrypted watermark sound data consistent with a voice of an occupant of said first vehicle and first vehicular information;
   extracting said encrypted watermark sound data, a voice print, and said first vehicular information from said corroboration data;

using said multiplexer, switching said corroboration channel from receiving telemetry data from a second telematics server of the plurality of telematics servers to a first telematics server of the plurality of telematics servers based at least in part on vehicular information that was transmitted from said vehicle as part of said corroboration data, wherein each of said telematics servers receives telemetry data from corresponding plural vehicles;

receiving, using said receiver, first telemetry data from said telematics server, said first telemetry data having been provided to said telematics server by said first vehicle;

by accessing said voice print library, authenticating said occupant by matching said voice print to a voice print in said voice print library;

determining that said first vehicular information and said first telemetry data are consistent;

in response to identifying consistency between said telemetry data and said first vehicular information, transmitting, using said transmitter, a signal that indicates that said first vehicular information and said first telemetry data are consistent.

2. The apparatus of claim 1, wherein said biometric corroborator server is configured to decode corroboration data in which said first vehicular information and said first telemetry data comprise GPS information indicative of said first vehicle's position.

3. The apparatus of claim 1, wherein said biometric corroborator server is configured to decode corroboration data in which said first vehicular information and said first telemetry data comprise a location of said first vehicle.

4. The apparatus of claim 1, wherein said biometric corroborator server is configured to decode corroboration data in which said first vehicular information comprises an identity of said first vehicle.

5. The apparatus of claim 1, wherein said biometric corroborator server is configured to decode corroboration data in which said first vehicular information and said first telemetry data comprise a location of said first vehicle and an identity of said first vehicle.

6. The apparatus of claim 1, wherein said biometric corroborator server is configured to decode corroboration data in which said first vehicular information and said first telemetry data comprise a time-varying operational parameter of said first vehicle.

7. The apparatus of claim 1, wherein said first vehicular information and said first telemetry data comprise first and second time-varying operational parameters of said first vehicle and wherein said biometric corroborator server is configured to inspect said first and second time-varying operational parameters for consistency.

8. The apparatus of claim 1, wherein said first vehicular information and said first telemetry data comprise information provided by an on-board diagnostic system of said first vehicle.

9. The apparatus of claim 1, wherein said biometric corroborator server is further perform operations comprising:
receiving, from a second vehicle, second corroboration data;
receiving, from said second telematics server, second vehicle telemetry data to which said second vehicle sends telemetry data;
based on said second corroboration data and said second telemetry data, determining that said second corroboration data and said second telemetry data are inconsistent; and
providing information indicative of said inconsistency.

10. The apparatus of claim 1, wherein said corroboration data has been encoded and wherein said biometric corroborator server is configured to decode said encoded data to retrieve said voice print and said first vehicular information.

11. The apparatus of claim 1, wherein said first vehicular information comprises first and second time-varying operational parameters of said first vehicle and wherein said biometric corroborator server is configured to identify an inconsistency between said first and second time-varying operational parameters.

12. The apparatus of claim 1, wherein said biometric corroborator server is configured to cease reception of said first telemetry data and to commence receipt of second telemetry data, said second telemetry being associated with a second vehicle.

13. The apparatus of claim 1, wherein said watermark has been steganographically incorporated into said sound file.

14. The apparatus of claim 1, wherein said biometric corroborator server is configured to identify an encrypted watermark that has been associated with said sound file.

15. The apparatus of claim 1, wherein said sound file comprises non-audible data.

16. A method executed by a biometric corroborator server that is in communication with a telematics server that is in communication with a plurality of vehicles, among which is a first vehicle, said method comprising:
receiving, using said receiver, corroboration data from said first vehicle, said corroboration data comprising a sound file with an encrypted watermark sound data consistent with an occupant's voice of said first vehicle, and first vehicular information;
switching, using a multiplexer, a corroboration channel from receiving telemetry data from a second telematics server of the plurality of telematics servers to a first telematics server of the plurality of telematics servers based at least in part on said first vehicular information, which was transmitted from said vehicle as part of corroboration data, wherein each of said telematics servers receives telemetry data from corresponding plural vehicles;
extracting said encrypted watermark sound data, a voice print and said first vehicular information from said corroboration data;
authenticating, by accessing a voice print library of said biometric corroborator server, said occupant by matching said voice print to a voice print in said voice print library; and
based on a result of having carried out said voice biometry, receiving first telemetry data from said telematics server, said first telemetry data having been provided to said telematics server by said first vehicle;
receiving, using said receiver, first telemetry data from said telematics server, said first telemetry data having been provided to said telematics server by said first vehicle;
determining that said first vehicular information and said first telemetry data are consistent; and
as a result of having determined that said first vehicular information and said first telemetry data are consistent, transmitting, using said transmitter, a signal that indicates that said first vehicular information and said first telemetry data are consistent.

* * * * *